US010318656B2

(12) United States Patent
Cox et al.

(10) Patent No.: US 10,318,656 B2
(45) Date of Patent: Jun. 11, 2019

(54) SYSTEMS AND METHODS FOR OPTIMIZING COMPONENT PLACEMENT IN A BATTERY DESIGN

(71) Applicant: The Boeing Company, Chicago, IL (US)

(72) Inventors: Kelsea Cox, Harvest, AL (US); Laura S. Kang, Seattle, WA (US); David E. Hall, Madison, AL (US); Vincent O. Dominguez, Harvest, AL (US); Dwaine K. Coates, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 436 days.

(21) Appl. No.: 15/138,815

(22) Filed: Apr. 26, 2016

(65) Prior Publication Data

US 2017/0308623 A1 Oct. 26, 2017

(51) Int. Cl.
| G06F 17/50 | (2006.01) |
| H01M 10/04 | (2006.01) |
| G06F 17/11 | (2006.01) |

(52) U.S. Cl.
CPC .............. *G06F 17/50* (2013.01); *G06F 17/11* (2013.01); *G06F 17/5009* (2013.01); *H01M 10/04* (2013.01); *G06F 2217/06* (2013.01); *G06F 2217/08* (2013.01)

(58) Field of Classification Search
CPC ...................................... G06F 17/50
USPC ......................................... 703/2, 1
See application file for complete search history.

(56) References Cited

U.S. PATENT DOCUMENTS

| 4,224,383 A | 9/1980 | Taylor |
| 4,297,639 A | 10/1981 | Branham |
| 2012/0046766 A1 | 2/2012 | Zhang et al. |
| 2017/0108553 A1* | 4/2017 | Ganesan ............ G01R 31/3679 |

OTHER PUBLICATIONS

Bernardo Severino, Multi-objective optimal design of lithium-ion battery packs based on evolutionary algorithms 2014, Journal of Power Sources 267, pp. 288-299. (Year: 2014).*

(Continued)

*Primary Examiner* — Andy Ho
(74) *Attorney, Agent, or Firm* — MH2 Technology Law Group LLP (57) ABSTRACT

Systems, computer readable media, and method concern determining operational parameters of an inventory of components to be included in a battery. The components can include storage components and electrical components. The method includes generating a system of equations that describe suitable combinations of components in locations in a battery design layout for the battery, the system of equations being generated based at least partially on rules and constraints, and includes analyzing the system of equations using integer optimization. The integer optimization can optimizes, based at least partially on the operational parameters, one or more objective functions in the system of equations to determine at least one solution for the battery design layout, and the at least one solution can include a set of the components for the locations in the battery design layout for the battery. The method includes providing, via an interface, the at least one solution.

17 Claims, 8 Drawing Sheets

(56) References Cited

OTHER PUBLICATIONS

Dwaine K. Coates et al., "Systems and Methods for Screening and Matching Battery Cells and Electronics", U.S. Appl. No. 14/860,173, filed Sep. 21, 2015.
Extended European Search Report dated Aug. 28, 2017 in EP Application No. 17 16 6898, 14 pages.
Severino Bernardo et al: "Multi-objective optimal design of lithium-ion battery packs based on evolutionary algorithms", Journal of Power Sources, vol. 267, May 28, 2014, pp. 288-299.
Philipp Wolf et al: "On optimizing sensor placement for spatio-temporal temperature estimation in large battery packs", IEEE 51st Annual Conference on Decision and Control, Dec. 10, 2012, pp. 973-978.
Anonymous: "Mixed-integer linear programming (MILP)—MATLAB intlinprog", MATLAB Documentation, Mar. 20, 2015, pp. 1-28 URL:https://web.archive.org/web/20150320190504/https://mathworks.com/help/optim/ug/intlinprog.html.
Kalinli, "Component Value Selection for Active Filters Using Parallel Tabu Search Algorithm," 2004, International Journal of Electronics and Communications, pp. 85-92.
Katsigiannis et al., Optimal Sizing of Small Isolated Hybrid Power Systems Using Tabu Search, May 5, 2008, Journal of Optoelectronics and Advanced Materials, vol. 10, No. 5, pp. 1241-1245.
Examination Report dated Aug. 13, 2018 in corresponding Ep Application No. 17 166 898.1.
Joris, Pierre (EP Examiner), extended European Search Report dated Feb. 20, 2018 in related European Application No. 17188178.2 (17 pages).
Adnan et al, "A Modified Tabu Search Approach for the Clustering Problem," Journal of Applied Sciences 11 (1): 3447-3453, 2011 (8 pages).
Chu et aL, "A Clustering Algorithm Using the Tabu Search Approach With Simulated Annealing," Data Mining II (2000), pp. 515-523.
Shin et al., "A Statistical Model-based Cell-to-Cell Variability Management of Li-ion Battery Pack," IEEE Transactions on Computer-Aided Design of Integrated Circuits and Systems, vol. 34, No. 2, Feb. 2015, pp. 252-265.
Author Unknown, Wikipedia "Tabu Search," https://en.wikipedia.org/w/index.php?title=Tabu_search&oldid=732792195, downloaded May 02, 2018, 5 pages.

\* cited by examiner

Fuse/Cell Information

| Inputs | | |
|---|---|---|
| | Capacity Column | Charge_Capacity(Ah) |
| | Impedance Column | Internal_Resistance(Ohm) |
| | Cycle Number | 2 |
| | Step Number | 24 |
| | Data Manipulation | Cell Only |
| | Data Filter Constraint | 2 sigmas |
| | Cell Data Type | Arbin |

Clear Data

Clear Unused Data

Get Data From EXCEL

Get Unused Data

Filter Data

Summary

| | | |
|---|---|---|
| Inputs | Number of Modules | 6 |
| | Number of Virtual Cells per Module | 9 |
| | Number of Cells per Virtual Cell | 8 |
| | Optimization Option | Cell and New Fuse |
| Outputs | Number of cells provided | 494 |
| | Number of new fuses provided | 450 |
| | Number needed to build modules | 432 |

FIG. 3B

Optimization Settings

Optimization Objectives

1. Minimize the difference in impedance across all modules
2. Minimize the difference in capacity across all virtual cells
3. Minimize the difference in impedance within each virtual cell

| Inputs | | |
|---|---|---|
| Weight for Objective 1 | 0.25 | |
| Weight for Objective 2 | 0.5 | |
| Weight for Objective 3 | 1 | |

\* Change weight for each component for emphasizing different criteria. Default = 1

| Inputs | | |
|---|---|---|
| Optimality Gap | 0.005 | 0.026 |
| Time Limit (hours) | 15 | |

* Lower the optimality gap, longer the solution time and better the solution quality.
* Default = 0.005 (the solution generated is guaranteed to be within 0.5% of the optimal solution)
* Optimization will stop whenever it reaches optimality gap or time limit Solve

| Outputs | |
|---|---|
| Runtime Duration (hours) | 15.25 |

\* Duration it took to generate the current solution. There could be some discrepancy with time limit

SYSTEMS AND METHODS FOR OPTIMIZING COMPONENT PLACEMENT IN A BATTERY DESIGN

GOVERNMENT CONTRACTS

The invention described herein was made in the performance of work under NASA Contract No. NNK14MA75C and is subject to the provisions of Section 305 of the National Aeronautics and Space Act of 1958 (72 Stat. 435: 42U.S.C.2457.)

BACKGROUND

Currently, large-scale batteries can be construed of individual battery cells and electrical components coupled in various electrical arrangements. The large-scale batteries can be formed of modular sub-units consisting of commercial off-the-shelf (COTS) battery cells. The approach of using small cells in large batteries results in a total cell count of hundreds or thousands of cells in the battery. Battery performance, however, can be affected due to variations in individual cell and other battery component performance.

SUMMARY

Aspects of the present disclosure concern a method that includes determining operational parameters of an inventory of components to be included in a battery. The components can include storage components and electrical components. The method also includes generating a system of equations that describe suitable combinations of components in locations in a battery design layout for the battery, the system of equations being generated based at least partially on rules and constraints. Further, the method includes analyzing the system of equations using integer optimization. The integer optimization can optimizes, based at least partially on the operational parameters, one or more objective functions in the system of equations to determine at least one solution for the battery design layout, and the at least one solution can include a set of the components for the locations in the battery design layout for the battery. The method also includes providing, via an interface, the at least one solution to a user.

Additional aspects of the present disclosure concern a system that includes one or more memory devices storing instructions, and one or more processors coupled to the one or more memory devices and configured to execute the instructions to perform a method. The method includes determining operational parameters of an inventory of components to be included in a battery. The components can include storage components and electrical components. The method also includes generating a system of equations that describe suitable combinations of components in locations in a battery design layout for the battery, the system of equations being generated based at least partially on rules and constraints. Further, the method includes analyzing the system of equations using integer optimization. The integer optimization can optimizes, based at least partially on the operational parameters, one or more objective functions in the system of equations to determine at least one solution for the battery design layout, and the at least one solution can include a set of the components for the locations in the battery design layout for the battery. The method also includes providing, via an interface, the at least one solution to a user.

Additional aspects of the present disclosure concern a non-transitory computer readable medium storing instructions for causing one or more processors to perform a method. The method includes determining operational parameters of an inventory of components to be included in a battery. The components can include storage components and electrical components. The method also includes generating a system of equations that describe suitable combinations of components in locations in a battery design layout for the battery, the system of equations being generated based at least partially on rules and constraints. Further, the method includes analyzing the system of equations using integer optimization. The integer optimization can optimizes, based at least partially on the operational parameters, one or more objective functions in the system of equations to determine at least one solution for the battery design layout, and the at least one solution can include a set of the components for the locations in the battery design layout for the battery. The method also includes providing, via an interface, the at least one solution to a user.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
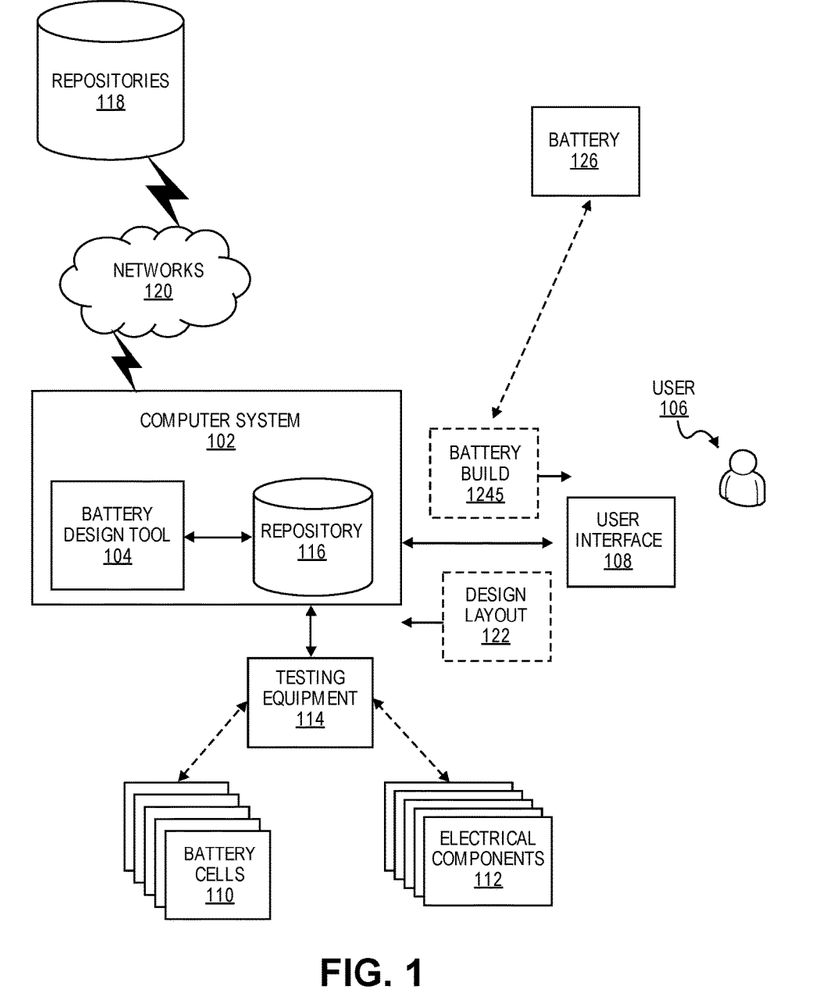
FIG. 1 illustrates an example of a design environment and computer system that includes a battery design tool, according to various aspects of the present disclosure.

FIG. 1 illustrates a design environment 100 in which a battery layout can be tested and determined, according to aspects of the present disclosure. While FIG. 1 illustrates various components contained in the design environment 100, FIG. 1 illustrates one example of a design environment and additional components can be added and existing components can be removed.

As illustrated in FIG. 1, the design environment 100 includes a computer system 102. The design environment 100 can represent the computer systems and network hardware of public or private entities, such as governmental agencies, individuals, businesses, partnerships, companies, corporations, etc., utilized to support the entities. The computer system 102 can be any type of conventional computer systems that is operating in the design environment 100 or supporting the design environment 100. For example, the computer system 102 can include various types of servers, such as file servers, web servers, application servers, database servers, email servers and the like, that provide services within the design environment 100. Likewise, for example, the computer system 102 can include laptop computers, desktop computers, tablet computers, mobile phones, and the like used by the personnel of the entities.

Additionally, for example, the design environment 100 includes other hardware and computer systems that support the design environment 100. For example, the design environment 100 can include gateways, routers, wireless access points, firewalls, and the like that support any type of communications networks to allow the computing systems in the design environment 100 to communicate. In any of the examples, the computer systems, including the computer system 102, in the design environment 100 include hardware resources, such as processors, memory, network hardware, storage devices, and the like, and software resources, such as operating systems (OS), application programs, and the like.

According to aspects of the present disclosure, the computer system 102 is configured to execute a battery design tool 104. The battery design tool 104 is configured to screen and match components, for example, battery cells 110 and electrical components 112, in a battery design layout 122 that includes multiple battery cells and electrical components. The electrical components 112 may include a plurality of one or more of fuses, pass transistors, diodes, thermosensors, and an indicator. The battery design tool 104 is configured to determine a set of constraints and objective functions that represent the battery design layout 122 and apply operational parameters of the component, the set of constraints, and objective function to one or more integer optimization algorithms or solvers. Utilizing the one or more integer optimization algorithms or solvers, the battery design tool 104 can determine a solution or a battery build 124 for the battery design layout 122 that optimizes the placement of individual components in a battery 126.

In aspects, the battery design tool 104 is configured as a software program that is capable of being stored on and executed by the computer system 102. The battery design tool 104 can be written in a variety of programming languages, such as JAVA, C++, Python code, Visual Basic, hypertext markup language (HTML), extensible markup language (XML), and the like to accommodate a variety of operating systems, computing system architectures, etc.

The battery design tool 104 is configured to operate, at least partially, under the control of a user 106. To receive input and output results to the user 106, the battery design tool 104 is configured to generate and provide a user interface 108. The user interface 108 can be any type of command line and/or graphical user interface (GUI) that allows the user 106 to interact with the battery design tool 104. The battery design tool 104 is configured to provide, via the user interface 108, controls, forms, reports, etc., to allow the user 106 to interact with the battery design tool 104 and perform the processes described herein.

In aspects, the operational parameters utilized by the battery design tool 104 can include any information and metrics that describe an actual operational performance of the components, e.g., the battery cells 110 and the electrical components 112. For example, the operational parameters of the battery cells can include capacity, impedance, ampere-hour rating of the battery cell, internal resistance of the battery, the open circuit voltage of the battery, state of charge of the battery, etc. For example, the operational parameters of the electrical components can include equivalent resistance at different temperatures and impedance at different temperatures. In aspects, the battery design tool 104 can be configured to utilize operational parameters and data that is created, transmitted or stored in any format, for example, Arbin, Maacor, etc.

In some aspects, the operational parameters can be received from manufacturers of the components, e.g., theoretical operational parameters. In some aspects, the operational parameters can be determined by a third party or separate computer system and provided to the computer system 102 and the battery design tool 104. In some aspects, the operational parameters can be determined by the computer system 102 and the battery design tool 104.

For example, to determine the operational parameters, the computer system 102 can be coupled to testing equipment 114. The testing equipment 114 can include electronics and circuits that place the battery cells 110 and the electrical components 112 under real-world operational conditions. The testing equipment 114 can also include one or more sensors that measure the operational parameters of the battery cells 110 and the electrical components 112 under the real-world operational conditions. Additionally, for example, the operational parameters can also include parameters calculated from the measured data such as IR trends and capacity trends.

In aspects, the computer system 102 includes a repository 116. The repository 116 can be configured to store data utilized by the battery design tool 104. For example, the repository 116 can store the operational parameters determined by the battery design tool 104 utilizing the testing equipment 114. Likewise, for example, the repository 116 can store databases that include an inventory of components, e.g., the battery cells 110 and the electrical components 112, and details of the battery cells 110 and the electrical components 112 such as identification of each of the battery cells 110 and electrical components 112 (e.g. serial number), the specifications of the battery cells 110 and the electrical components 112, and theoretical operational parameters of the battery cells 110 and the electrical components 112 (e.g. manufacturer designated operational parameters).

In aspects, the computer system 102 can be coupled to one or more repositories 118 via one or more networks 120. For example, the repositories 118 can be operated and maintained by manufactures of the components, e.g., the battery cells 110 and the electrical components 112. The battery design tool 104 can be configured to retrieve, via a network 120, details of the components, e.g., the battery cells 110 and the electrical components 112 from the repositories 118. The network 120 can be any type of network whether public or private. The repository 118 can be any type of computer system that stores information about the components.

Figure 2:
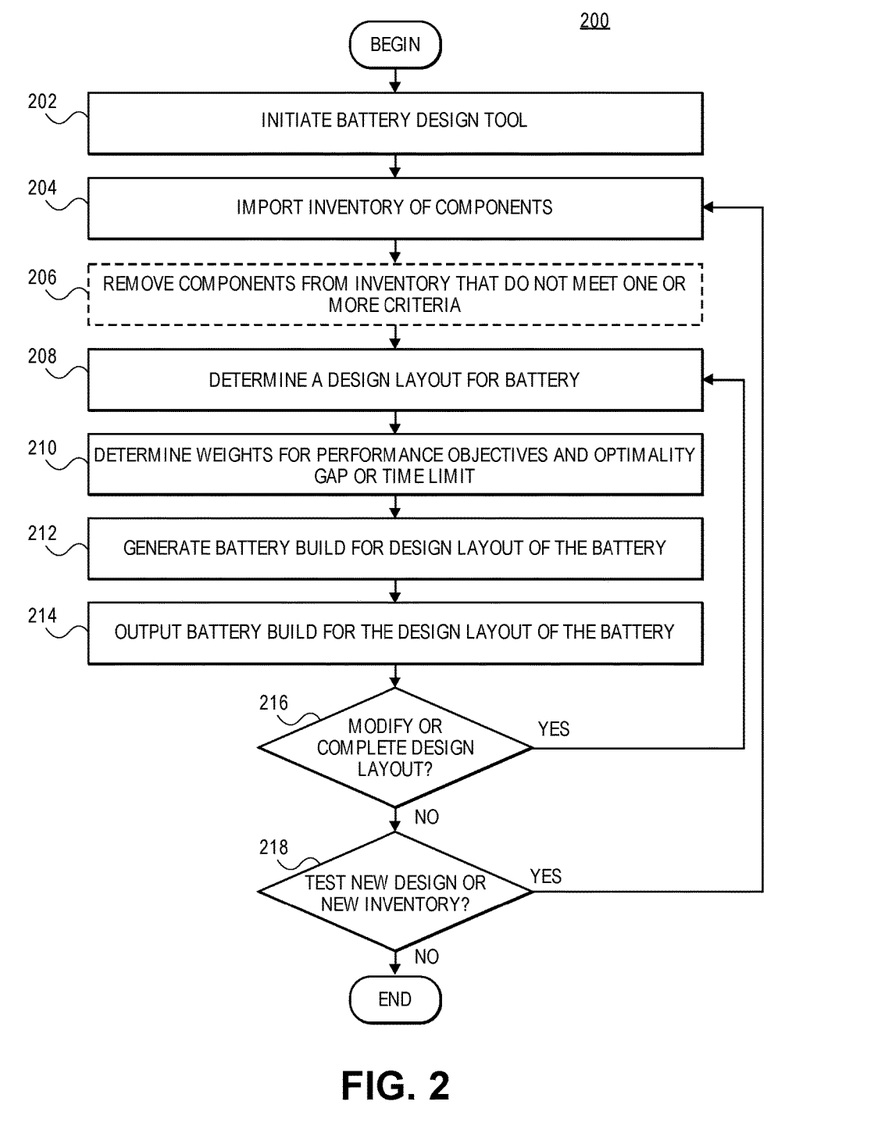
FIG. 2 illustrates an example of a process of designing a battery, according to various aspects of the present disclosure.

FIG. 2 illustrates one example of a process 200 for designing a battery from components, according to aspects of the present disclosure. While FIG. 2 illustrates various stages that can be performed, stages can be removed and additional stages can be added. Likewise, the order of the illustrated stages can be performed in any order.

Figure 3A:
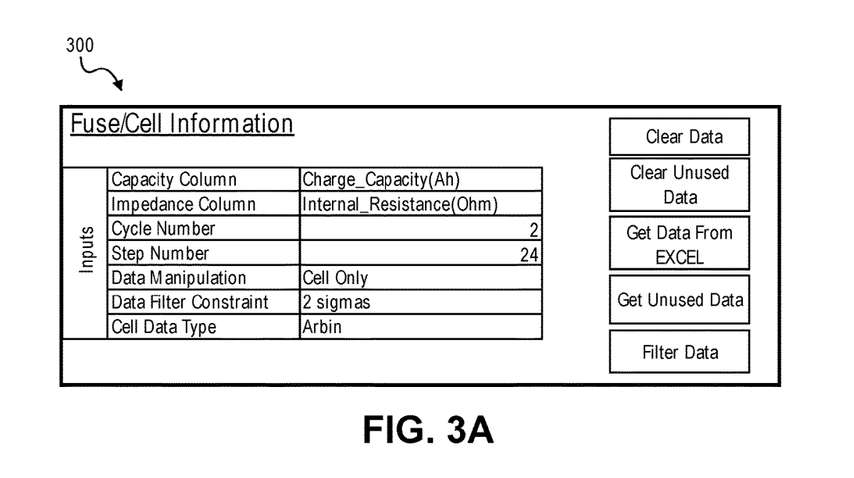
FIGS. 3A-3C illustrate examples of user interfaces for communicating with the battery design tool, according to various aspects of the present disclosure.
Figure 3B:
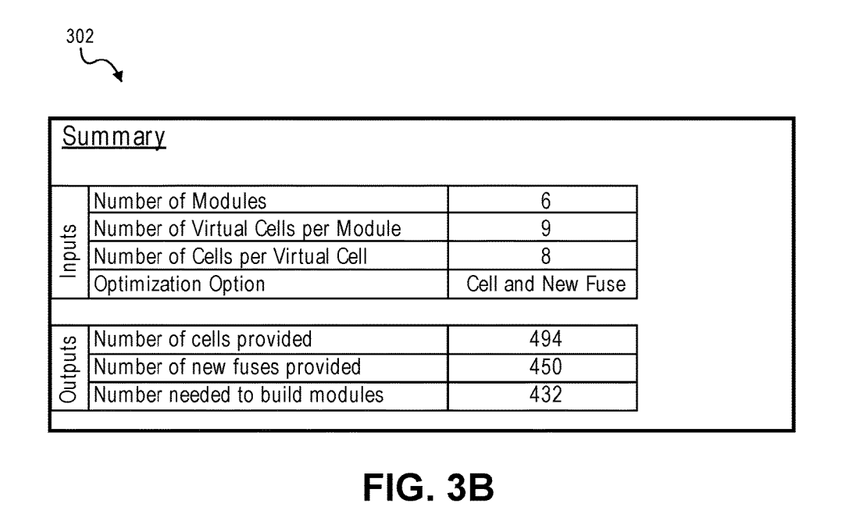
Figure 3C:
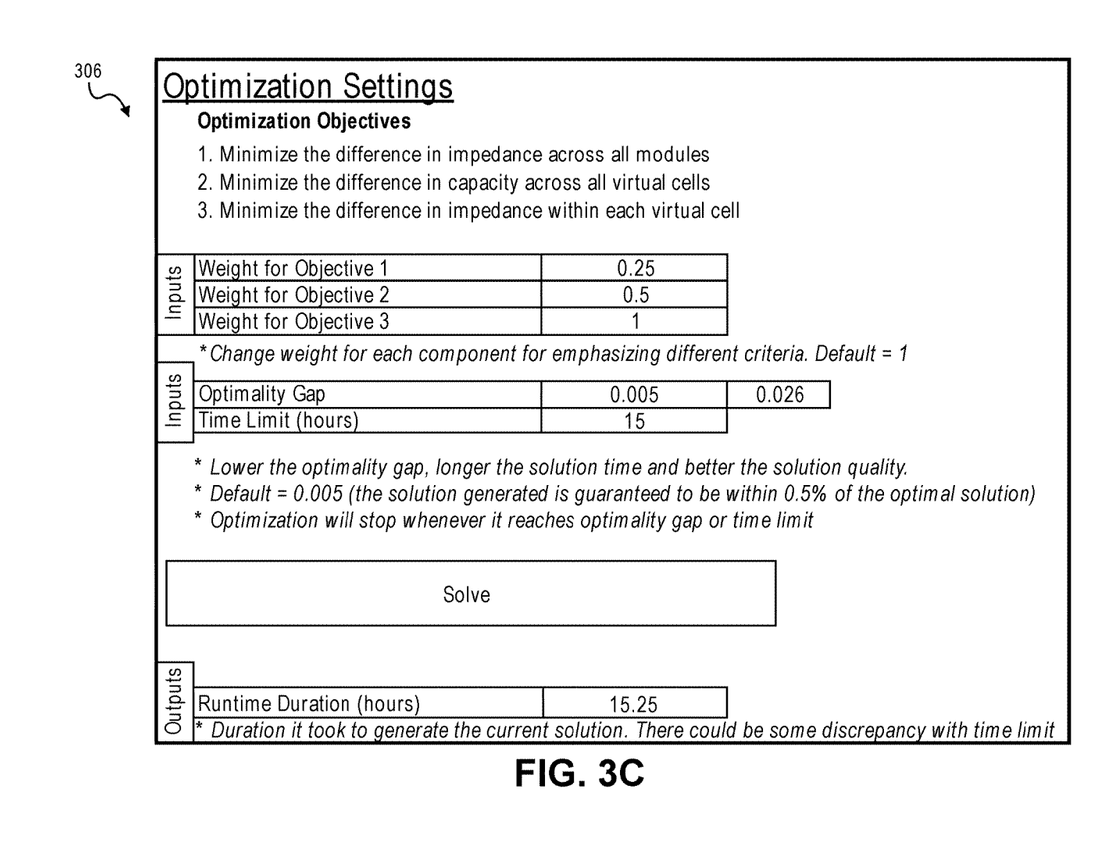

After the process begins, in 202, the battery design tool 104 is initiated. For example, the user 106 can initiate execution of the battery design tool 104 on the computer system 102. Once initiated, the battery design tool 104 can provide the user interface 108 to the user 106. The user interface 108 can allow the user 106 to operate the battery design tool 104. For example, FIGS. 3A-3C illustrate examples of the user interface 108 as discussed further below.

In 204, the battery design tool imports an inventory of components. The components can include battery cells and electrical components such as fuses, resistors, capacitors, etc. The inventory of components can include an identification of the components and details of the components (e.g., operational parameters of the components). For example, the battery design tool 104 can communicate with the testing equipment 114 to determine the operational parameters of the components, e.g., the battery cells 110 and the electrical components 112. Likewise, for example, the battery design tool 104 may have previously tested the components and can retrieve the operational parameters for the components that were previously tested. Likewise, the battery design tool 104 can retrieve (or can have previously retrieved) the theoretical operational parameters of the components, e.g., the battery cells 110 and the electrical components 112 (e.g. manufacturer designated operational parameters).

In an example, as further described below, the components in inventory can include both battery cells and fuses. FIGS. 3A and 3B illustrate examples of a user interface 300 for retrieving inventory and viewing the details of the components.

In 206, the battery design tool optionally removes components from inventory that do not meet one or more criteria. For example, the battery design tool 104 can maintain one or more criteria for the operational parameters. The one or more criteria can be preset in the battery design tool 104. Likewise, the one or more criteria can be selected or set by the user 106, via the user interface 108. The decision to perform the removal of inventory can be preset in the battery design tool 104. Likewise, the decision to perform the removal of inventory can be selected or set by the user 106, via the user interface 108.

For example, the user 106 can instruct the battery design tool 104 to filter components from the inventory that do not have operational parameters within a certain criteria, for example, operational parameters within a certain standard deviation (e.g., 1, 2, or 3, sigmas). In response, the battery design tool 104 can remove the components from the inventory when determining the battery design layout. As illustrated in FIG. 3A, the user 106 can specify the one or more criteria for removing components from the inventory.

In an example as further described below, the battery design layout can include both battery cells and fuses and the operational parameters can include:

1. Cell capacity,
2. Cell impedance, and
3. Fuse impedance.

In 208, the battery design tool 104 determines a design layout for a battery. In aspects, the design layout for a battery can include a structure of the battery (e.g., a circuit diagram or configuration) that is composed of components, e.g., battery cells and electrical components, to provide a desired performance for the battery. The design layout for the battery can also include a number, type, location etc. of components that are to be included in the battery. For example, the circuit diagram can include components such as battery cells and electrical components in various electrical arrangements (e.g. series and parallel circuit configurations) to provide a desired performance for the battery (e.g. a desired output voltage, current, lifetime, etc.)

In some aspects, the battery design tool 104 can determine and utilize a design layout for the battery that is a complete design layout. For example, if the design layout is a complete design layout, the design layout can include the structure of the battery (e.g., a circuit diagram or configuration) and a complete specification (e.g., number, type, location etc.) of the components, e.g., the battery cells 110 and the electrical components 112, to be included in the structure of the battery.

In some aspects, the battery design tool 104 can determine and utilize a design layout for the battery that is a partial design layout. For example, if the design layout is a partial design layout, the design layout can include a partial structure of the battery (e.g., a circuit diagram or configuration); a partial specification of the components, e.g., the battery cells 110 and the electrical components 112, to be included in the structure of the battery; or combination thereof. For instance, in one example, the design layout can include the structure of the battery (e.g., a circuit diagram or configuration) and a specification (e.g., number, type, location, etc.) of battery cells to be included in the structure of the battery but not specify other electrical components to be included in the structure (e.g., fuses). In another example, the design layout can include the structure of the battery (e.g., a circuit diagram or configuration) and a specification (e.g., number, type, location, etc.) of electrical components to be included in the structure (e.g., fuses) to be included in the structure of the battery but not specify the battery cells.

In aspects, the user 106 can input or select, via the user interface 108, a design layout for a battery. For example, the user 106 can input, via the user interface 108, the structure of the battery (e.g., a circuit diagram or configuration), the specification (e.g., number, type, location etc.) of the components, e.g., the battery cells 110 and the electrical components 112, to be included in the structure of the battery, or combination thereof. The user 106 can input, via the user interface 108, a complete design layout for a battery, a partial design layout for the battery, or combination thereof. In some aspects, for example, the battery design tool 104 can provide, via the user interface 108, a circuit design interface that allows the user 106 to design the structure for the battery and partially or completely provide the specification of the components.

Likewise, for example, the user 106 can select, via the user interface 108, the structure of the battery (e.g., a circuit diagram or configuration), the specification (e.g., number, type, location etc.) of the components, e.g., the battery cells 110 and the electrical components 112, to be included in the structure of the battery, or combination thereof. The user 106 can select, via the user interface 108, a complete design layout for a battery, a partial design layout for the battery, or combination thereof. In one example, the user 106 can select the structure of the battery (e.g., a circuit diagram or configuration) and input either a partial or complete specification of the electrical components. For example, the battery design tool 104 can store one or more design layouts for different battery configurations, and the user 106 can select one or more of the stored design layouts.

In aspects, the user 106, via the user interface 108, can select a complete layout or a partial layout that was previously evaluated by the battery design tool 104 for completion, modification, or revision. In one example, the user may have previously input or selected a complete layout and generated a battery build. In another example, the user 106 may have previously input or selected a partial layout that included a specification (e.g., number, type, location, etc.) of battery cells to be included in the structure of the battery but not specify other electrical components to be included in the structure (e.g., fuses), and a battery build may have been generated by the battery design tool 104. Likewise, in another example, the user 106 may have previously input or selected a partial layout that included a specification (e.g., number, type, location, etc.) of electrical components to be included in the structure (e.g., fuses) of the battery but not specify the battery cells, and a battery build may have been generated by the battery design tool 104. In any example, the battery design tool 104 can store the complete or partial layout including the battery build determined by the battery design tool 104. The user 106, via the user interface 108, can select the stored complete or the stored partial layout that was previously evaluated by the battery design tool 104 for completion or revision, for example, by inputting specification of the battery cells, electrical components, or combination thereof. This may allow the user to partially generate an optimized battery build for available components and complete the partial design layout once additional components are available, new components are manufactured, requirements of the battery change, etc. Likewise, this may allow the use to generate a complete optimized battery build and revise or modify the design layout at a later time, for example, as new components are manufactured, requirements of the battery change, etc.

In aspects, the user 106 can input requirements for the battery, and the battery design tool 104 can automatically generate a design layout, whether partial or complete, for a battery.

Figure 4A:
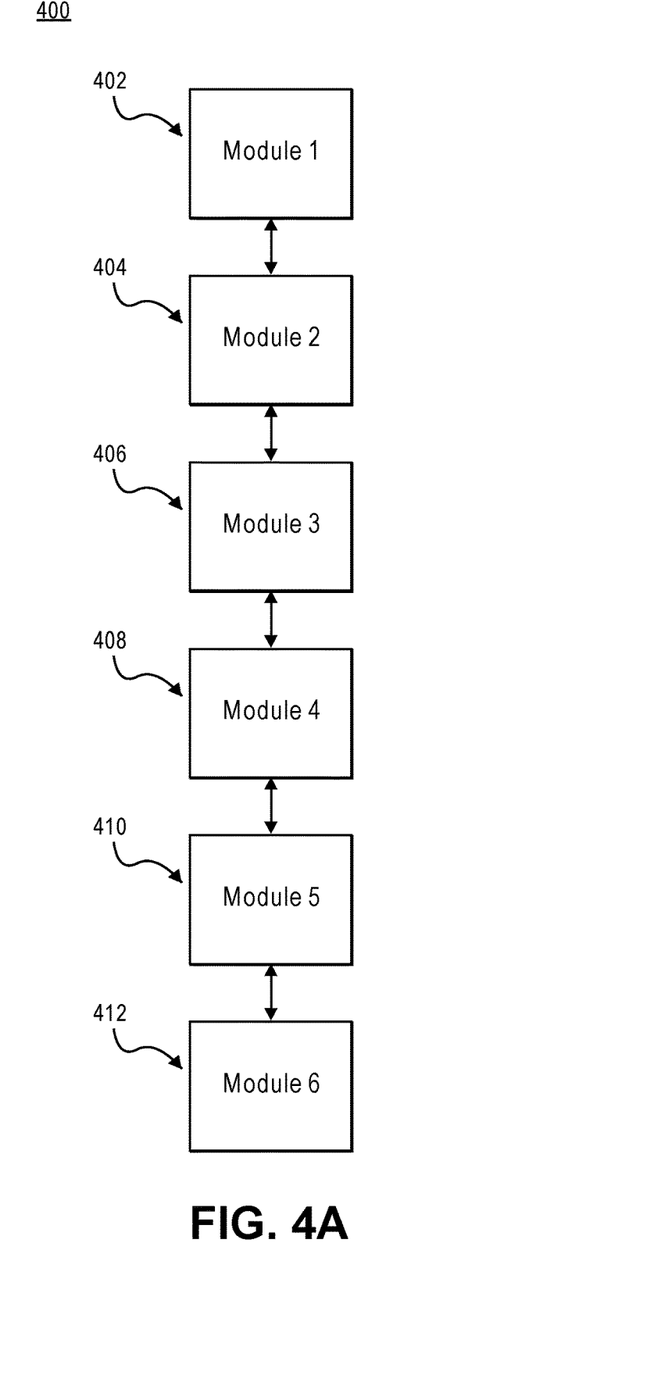
FIGS. 4A and 4B illustrate examples of a design layout for a battery, according to various aspects of the present disclosure.

FIGS. 4A and 4B illustrate an example of a design layout for a battery. For example, as illustrated in FIG. 4A, a design layout 400 for a battery can consist of six (6) modules: Module 1 402, Module 2 404, Module 3 406, Module 4 408, Module 5 410, and Module 6, 412. The six modules can be coupled, for example, in series to produce a desired voltage and current for the battery. While illustrated as being coupled in series, the six modules can be coupled in any configuration, e.g., series, parallel, or combination thereof.

Figure 4B:
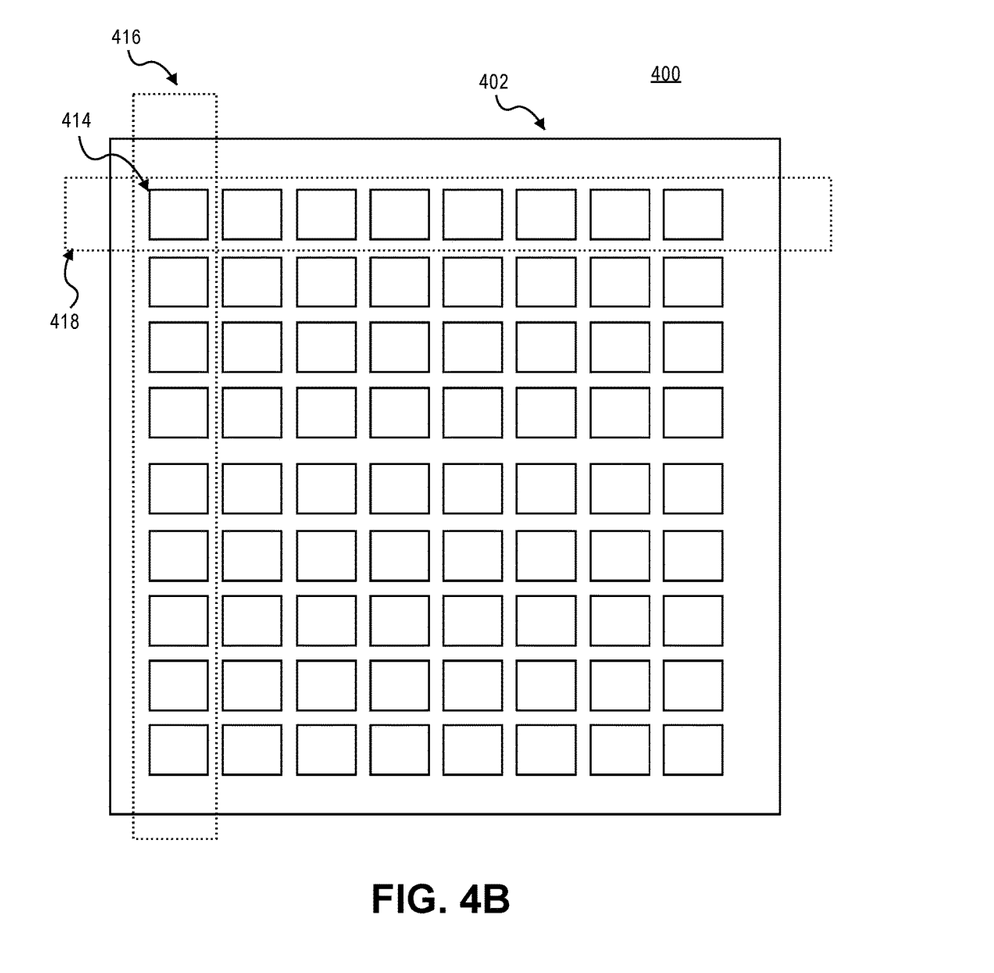

In this example, one or more components can be placed within a module at a specific location 414 and each location must be occupied. Each module can include a number of locations 414 arranged in rows and columns. For example, the Module 1 402 can include 72 locations 414 arranged in rows 416 and columns 418, as illustrated in FIG. 4B. In this example, the location can receive one or more components, e.g., a battery cell, a fuse, or combination thereof. In aspects, the locations 414 can be coupled in any arrangement, e.g., series, parallel, or combination thereof. In aspects, Module 1 402, Module 2 404, Module 3 406, Module 4 408, Module 5 410, and Module 6, 412 can have the same arrangements and locations. Likewise, in aspects, Module 1 402, Module 2 404, Module 3 406, Module 4 408, Module 5 410, and Module 6, 412 can have different arraignments and locations.

The location 414, within a module, can be described as a row/column pairing. In this example, each row can be described as a virtual cell. For example, the locations in a row may be connected to form a virtual cell. Each location at a column location can be termed a cell. In this example, each cell can comprise a battery cell or a battery cell and a fuse. As will be discussed below, the following notation can be used to described the design layout

| n | Battery Cell | 1 ... N |
| f | Fuse | 1 ... F |
| i | Module | 1 ... I |
| j | Virtual Cell (row) | 1 ... J |
| k | Cell (in virtual Cell) | 1 ... K |

In this example, as discussed above, the design layout 400 can be complete or partial. For example, the specification (location, type, number, etc.) of the battery cells and the specification (location, type, number, etc.) of the fuses may be included in the design layout 400. In another example, the specification (location, type, number, etc.) of the battery cells may be included in the design layout 400, but and the specification (location, type, number, etc.) of the fuses may not be included. In another example, the specification (location, type, number, etc.) of the fuses may be included in the design layout 400, but and the specification (location, type, number, etc.) of the battery cells may not be included.

In 210, weights for performance objectives and optimality gap or time limit are determined. The weights can be preset in the battery design tool 104. Likewise, the user 106 can input, via the user interface 108, the weights. The optimality gap or time limit can be preset in the battery design tool 104. Likewise, the user 106 can input, via the user interface 108, the optimality gap or time limit.

For example, the weights for the performance objectives can represent an importance of each performance objective in the battery design layout. The performance objectives can include a criteria that describes a desired performance of the battery design layout. The performance objectives can include, for example, minimize the difference in capacity across all virtual cells, minimize the difference in impedance within each virtual cell, and minimize the difference in impedance across all modules.

Likewise, for example, optimality gap can represent a gauge of solution (battery build) for the battery design layout. For example, optimality gap can provide a margin by which the battery design tool 104 will calculate a solution (battery build), e.g., within a percentage of the true optimal. FIG. 3C illustrate an example of a user interface 306 for inputting the objective weights and the optimality gap. The time limit can be an amount of time the battery design tool 104 will execute before providing a battery build.

In 212, the battery design tool 104 generates a battery build for the battery design layout of the battery. The battery build can represent an identification of specific component or components to be used at each location of the battery design layout. The battery design tool 104 can be configured to utilize integer optimization to generate a battery build. The battery design tool 104 can generate a problem definition that is defined by one or more equations to be solved. The problem definition can include decision variables, constraint equations, and objective functions. The battery design tool 104 can be configured to apply the problem definition to an integer optimization algorithm or solver that finds a battery build within the optimality gap.

For example, in a battery, the capacity of a unit cell in a module can be defined by equation (1) and the capacity of a virtual cell can be defined by equation (2):

$$\text{unit cell capacity} = \text{cell capacity} \quad (1)$$

$$\text{virtual cell capacity} = \Sigma \text{unit cell capacity} \quad (2).$$

The impedance of a unit cell in a module can be defined by equation (3), the impedance of a virtual cell can be defined by equation (4), the impedance of a module can be defined by equation (5):

$$\text{unit impendance} = \text{cell impedance} + \text{fuse impedance} \quad (3)$$

$$\frac{1}{\text{virtual cell impedance}} = \sum \frac{1}{\text{unit impedance}} \quad (4)$$

$$\text{module impedance} = \sum \text{virtual cell impedance} \quad (5)$$

To optimize placement of components within a battery design layout, the battery design tool 104 can define a decision variable, $x_{nijk}$, given by:

$$x_{nijk} = \begin{cases} 1 & \text{if cell unit } n \text{ is assigned to position } ijk \\ 0 & \text{otherwise} \end{cases} \quad (6)$$

If fuses are included, the battery design tool 104 can define a decision variable, $x_{fijk}$, given by:

$$x_{fijk} = \begin{cases} 1 & \text{if fuse unit } f \text{ is assigned to position } ijk \\ 0 & \text{otherwise} \end{cases} \quad (7)$$

The operational parameters of the components can be references by the following notation:

| | |
|---|---|
| $C_n$ | Capacity of a cell n |
| $Z_n$ | Impedance of cell n |
| $Z_f$ | Impedance of fuse f |

Constraints

To determine a battery build, the battery design tool 104 can determine a set of constraints. The constraints can be defined such that each component can only be placed in at most one position and each position needs to be occupied by a unit. The constraints can be given by the following equations:

$$\Sigma_{k=1}^{K}\Sigma_{j=1}^{J}\Sigma_{i=1}^{I}x_{nijk} \leq 1 \,\forall n \quad (8)$$

$$\Sigma_{n=1}^{N}x_{nijk} = 1 \,\forall i,j,k \quad (9)$$

$$\Sigma_{k=1}^{K}\Sigma_{j=1}^{J}\Sigma_{i=1}^{I}x_{fijk} \leq 1 \,\forall f \quad (10)$$

$$\Sigma_{f=1}^{F}x_{fijk} = 1 \,\forall i,j,k \quad (11)$$

Constraint equations (8) and (9) can ensure exactly one battery cell can placed in one position, ijk and each specific battery cell can be only used at most once. Constraint equations (10) and (11) ensure exactly one fuse is placed in one position, ijk and each fuse can be only used at most once. The battery design tool 104 can determine constraint equations (10) and (11) battery design layout includes fuses.

To determine the battery build, the battery design tool 104 can determine different objective functions. The objective functions can represent various parameters to optimize in the battery build, subject to the constraints. In one example, the battery design tool 104 can determine the object functions: minimize the difference in capacity across all virtual cells, minimize the difference in impedance within each virtual cell, and minimize the difference in impedance across all modules.

Minimize the Difference in Capacity Across all Virtual Cells

In an example, the battery design tool 104 may determine to minimize the difference in capacity and to increase the overall capacity of the battery. The battery design tool 104 can determine a decision variable $Y_{vc}$ that represents the minimum virtual cell capacity. To minimize the difference in capacity across all virtual cells, the battery design tool 104 can determine equation (12):

Maximize $Y_{vc}$ $$\Sigma_{k=1}^{K}\Sigma_{n=1}^{N}C_n * x_{nijk} \geq Y_{vc} \,\forall i,j \quad (12)$$

Minimize the Difference in Impedance within Each Virtual Cell

The battery design tool 104 can determine to maintain an approximate impedance value within each virtual cell. In the example described herein, each virtual cell can include 9 cells, and the battery design tool 104 can determine to maintain an approximately similar impedance value between. The battery design tool 104 can determine two decision variables for each virtual cell:

| | |
|---|---|
| $mZ_{ij}$ | Minimum cell impedance of virtual cell ij |
| $MZ_{ij}$ | Maximum cell impedance of virtual cell ij |

The battery design tool 104 can determine the following equation to minimize the impedance difference:

Minimize $\Sigma_{ij}(MZ_{ij} - mZ_{ij})$ $$mZ_{ij} \leq \Sigma_{n=1}^{N}Z_n * x_{nijk} \leq MZ_{ij} \,\forall i,j \quad (13)$$

$$mZ_{ij} \leq \Sigma_{n=1}^{N}Z_n * x_{nijk} + \Sigma_{f=1}^{F}Z_f * n_{fijk} \leq MZ_{ij} \,\forall i,j \quad (14)$$

Either equation (6) or (7) can used depending on whether a fuse is included.

Minimize the Difference in Impedance Across all Modules

The battery design tool 104 can determine an equation minimize the difference in impendence across all modules. This can be similar to capacity except that the equation to calculate module impedance is nonlinear. The battery design tool 104 can determine a decision variable $Y_{mod}$ which represents the minimum module impedance:

Maximize $Y_{mod}$ (15)

$$\sum_{j=1}^{J} \frac{1}{\sum_{k=1}^{K} \frac{1}{\sum_{n=1}^{N}Z_n * x_{nijk} + \sum_{f=1}^{F}Z_f * x_{fijk}}} \geq Y_{mod} \,\forall i$$

In an example, the battery design tool 104 may desire to not use a nonlinear function, and the battery design tool 104 can determine a linear summation as an approximation:

Maximize $Y_{mod}$ $$\Sigma_{j=1}^{J}(\Sigma_{n=1}^{N}Z_n * x_{nijk} + \Sigma_{f=1}^{F}Z_f * x_{fijk}) \geq Y_{mod} \,\forall i \quad (16)$$

Based on the three objective functions for each constraint and a weight for each constraint, the battery design tool 104 can determine an overall objective function given by:

Maximize $W_{vc} * Y_{vc} + W_{mod} * Y_{mod} - W_{zrange} * \Sigma_{ij}(MZ_{ij} - mZ_{ij})$ (17), wherein the formulation includes:

$\Sigma_{k=1}^{K}\Sigma_{j=1}^{J}\Sigma_{i=1}^{I}x_{nijk} \leq 1 \,\forall n$     battery cell allocation equation (8), $\Sigma_{n=1}^{N}x_{nijk} = 1 \,\forall i,j,k$     battery cell allocation equation (9), $\Sigma_{k=1}^{K}\Sigma_{j=1}^{J}\Sigma_{i=1}^{I}x_{fijk} \leq 1 \,\forall f$     fuse allocation equation (10), $$\Sigma_{f=1}^{F} x_{fijk} = 1 \, \forall i,j,k \quad \text{fuse allocation equation (11),}$$

$$\Sigma_{k=1}^{K} \Sigma_{n=1}^{N} C_n * x_{nijk} \geq Y_{vc} \, \forall i,j$$

Min diff in capacity across virtual cells equation (12), $$mZ_{ij} \leq \Sigma_{n=1}^{N} Z_n * x_{nijk} + \Sigma_{f=1}^{F} Z_f * x_{fijk} \leq MZ_{ij} \, \forall i,j$$

Min diff in impedance within virtual cell equation (14), and $$\Sigma_{j=1}^{J} (\Sigma_{n=1}^{N} Z_n * x_{nijk} + \Sigma_{f=1}^{F} Z_f * x_{fijk}) \geq Y_{mod} \, \forall i$$

Min diff in impedance across modules equation (16).

Utilizing inventory of components and the operational parameters, the battery design tool 104 can execute an integer optimizer or solver using the overall objective function and formulation to determine a battery build. The integer optimizer or solver can apply different combination of components to optimize the overall object function. The battery design tool 104 can execute the integer optimizer or solver until the optimality gap is reached or the optimal solution is found. Similarly, the user may define a time limit for the solver to run, and the battery tool 104 will execute the optimizer or solver until the time limit is reached.

Based on the results of the integer optimization, the battery design tool 104 can select specific components in the inventory for the locations specified in the design layout for the battery to form the battery build. The battery build can denote the potential combination of components, e.g. battery cells and fuses, by associating the identification (e.g. serial number) of the potential components with location in the battery design layout. In some aspects, the battery design tool 104 can select one potential combination of components for the battery build. In some aspects, the battery design tool 104 can select multiple combinations of components for the battery build.

In 214, the battery design tool 104 outputs battery build for the design layout of the battery. For example, in aspects, battery build can include the identification of components that may be potentially used for the locations of the battery design layout of the battery. In some aspects, the battery design tool 104 can output a list of identifications (e.g. serial numbers) of components and indication of the location in the battery design layout. In some aspects, the battery design tool 104 can output the design layout that includes identifications (e.g. serial numbers) of components recorded on the design layout. The battery design tool 104 can also store the battery build and the design layout.

In 216, the battery design tool 104 can determine whether the design layout is to be modified or completed. For example, the user 106 may desire to modify the design layout and determine a new battery build. If so, the process may return to 208. Likewise, for example, the design layout may be a partial design layout and the user 104 may desire to complete the design layout. If so, the process may return to 208. Also, The battery design tool 104 can also store the battery build and the design layout for later evaluation and completion.

In the process 200, the battery design tool 104 can perform the optimization for different inventory of components and different battery design layouts. In 218, the battery design tool 104 can perform the matching process for different design layouts for the battery. In 218, the design tool can determine whether to test a new design layout for the battery. If a new design layout is to be tested, the process 200 can return to 204. In 218, the battery design tool 104 can also determine whether to test a new inventory of components is to be tested. If a new inventory is to be tested, the process 200 can return to 204 and repeat the process of a new inventory of components. If a new design layout new inventory is not tested, the process can end.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
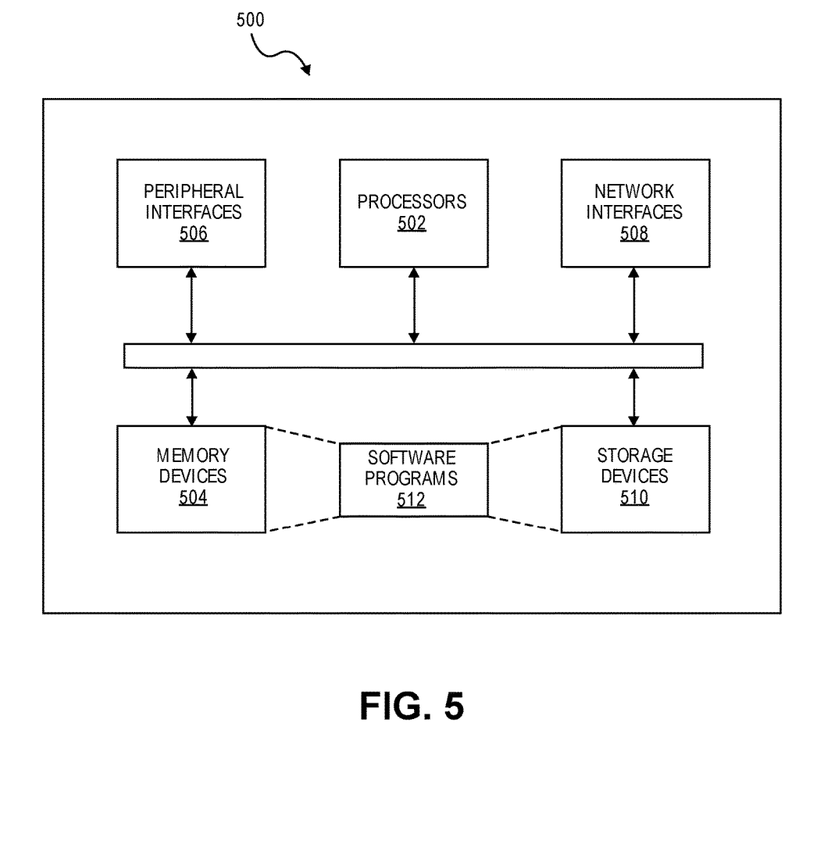
FIG. 5 illustrates an example of a hardware configuration for a computer device, according to various aspects of the present disclosure.

For example, FIG. 5 illustrates an example of a hardware configuration for the computer system 102. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the battery design tool 104 can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, for example the network 120, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the battery design tool 104 described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network (SAN) familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise a random access memory (RAM), a read only memory (ROM), a flash memory, an electrically erasable programmable read only memory (EEPROM), a compact disc read only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 6:
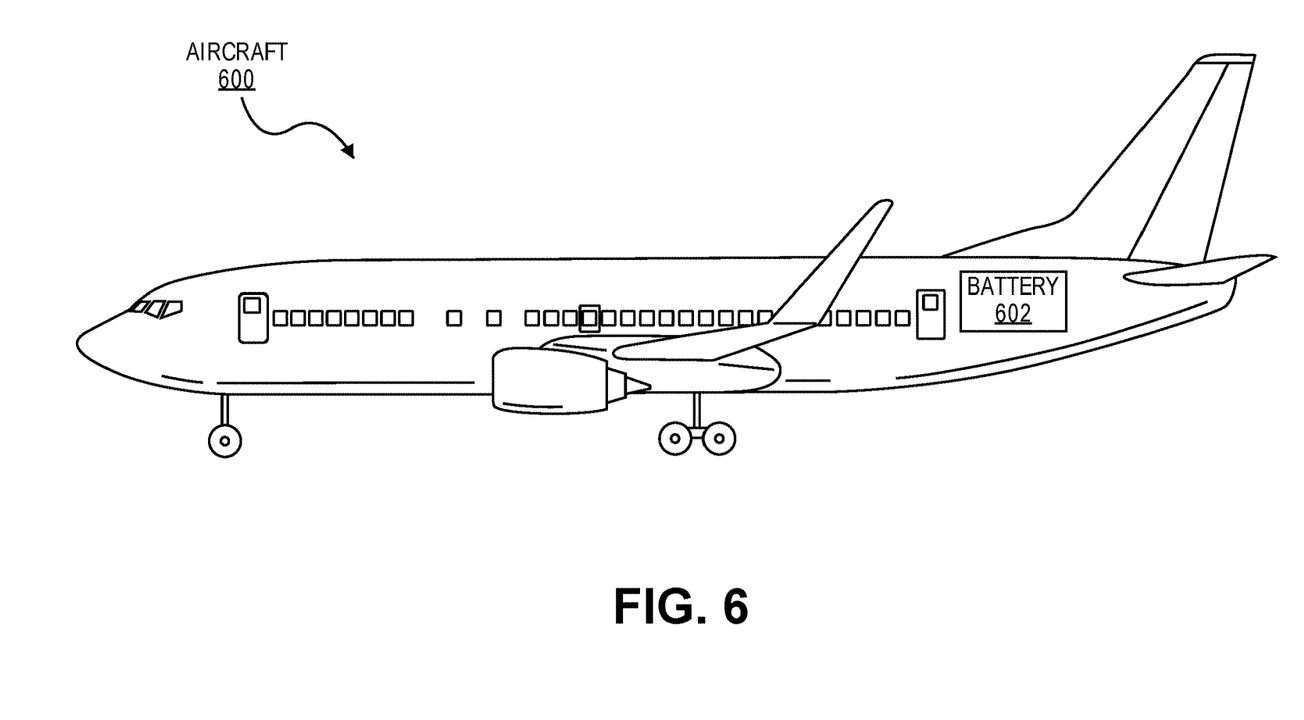
FIG. 6 illustrates an example of an application of the battery design tool, according to various aspects of the present disclosure.

In the aspects described above, the battery design tool 104 can be utilized to determine a design layout for a battery to be used in any type of application. FIG. 6 illustrates one example of an application for the battery design tool 104. As illustrated in FIG. 6, an aircraft 600 can include a battery 602. In aspects, the battery design tool 104 can be utilized to determine the deign layout of the battery 602.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method, comprising:
   determining operational parameters of an inventory of components to be included in a battery, wherein the components include storage components and electrical components;
   generating a system of equations that describe suitable combinations of components in locations in a battery design layout for the battery, the system of equations being generated based at least partially on rules and constraints, wherein the generating further comprises receiving, for a user, at least one of an optimality gap for a solution that provides for a margin by which the solution for the battery is within a predetermined percentage of optimal or a time limit of optimization, wherein integer optimization optimizes one or more objective functions within the optimality gap or until the time limit has been reached;
   analyzing the system of equations using integer optimization,
      wherein the integer optimization optimizes, based at least partially on the operational parameters, one or more objective functions in the system of equations to determine at least one solution for the battery design layout,
      wherein the at least one solution comprises a set of the components for the locations in the battery design layout for the battery
   providing, via an interface, the at least one solution to the user; and
   testing, by a battery testing equipment, the battery based on the battery design layout under operating conditions.

2. The method of claim 1, wherein the battery design layout of the battery comprises a partial set of the components to be included in the battery.

3. The method of claim 1, wherein the one or more objective functions comprise minimizing difference in capacity of virtual cells in the battery, minimizing difference in impedance of a module comprising the virtual cells, and minimizing difference in impedance in the virtual cells.

4. The method of claim 1, wherein the rules and constraints comprise a constraint that an individual component in the components only being used at one location in the locations in the battery design layout for the battery and each location is populated with exactly one combination of one or more individual components.

5. The method of claim 1, wherein the operational parameters comprise capacity of the components, impedance of the components, voltage of the components, and current of the components.

6. The method of claim 1, wherein the storage components comprise a plurality of one or more of lithium ion (Li-ion) cells, nickel cadmium (NiCad) cells, and nickel metal hydride (NiMh) cells, and wherein the electrical components comprise include a plurality of one or more of fuses, pass transistors, diodes, thermosensors, and an indicator.

7. A system, comprising:
one or more memory devices storing instructions; and
one or more processors coupled to the one or more memory devices and configured to execute the instructions to perform a method comprising:
determining operational parameters of an inventory of components to be included in a battery, wherein the components include storage components and electrical components;
generating a system of equations that describe suitable combinations of components in locations in a battery design layout for the battery, the system of equations being generated based at least partially on rules and constraints, wherein the generating further comprises receiving, for a user, at least one of an optimality clap for a solution that provides for a margin by which the solution for the battery is within a predetermined percentage of optimal or a time limit of optimization, wherein integer optimization optimizes one or more objective functions within the optimality gap or until the time limit has been reached;
analyzing the system of equations using integer optimization,
wherein the integer optimization optimizes, based at least partially on the operational parameters, one or more objective functions in the system of equations to determine at least one solution for the battery design layout, and
wherein the at least one solution comprises a set of the components for the locations in the battery design layout for the battery; and
providing, via an interface, the at least one solution to the user; and
testing, by a battery testing equipment, the battery based on the battery design layout under operating conditions.

8. The system of claim 7, wherein the battery design layout of the battery comprises a partial set of the components to be included in the battery.

9. The system of claim 7, wherein the one or more objective functions comprise minimizing difference in capacity of virtual cells in the battery, minimizing difference in impedance of a module comprising the virtual cells, and minimizing difference in impedance in the virtual cells.

10. The system of claim 7, wherein the rules and constraints comprise a constraint that an individual component in the components only being used at one location in the locations in the battery design layout for the battery and each location is populated with exactly one combination of one or more individual components.

11. The system of claim 7, wherein the operational parameters comprise capacity of the components, impedance of the components, voltage of the components, and current of the components.

12. The system of claim 7, wherein the storage components comprise a plurality of one or more of lithium ion (Li-ion) cells, nickel cadmium (NiCad) cells, and nickel metal hydride (NiMh) cells, and wherein the electrical components comprise include a plurality of one or more of fuses, pass transistors, diodes, thermosensors, and an indicator.

13. A non-transitory computer readable medium storing instructions for causing one or more processors to perform a method, the method comprising:
determining operational parameters of an inventory of components to be included in a battery, wherein the components include storage components and electrical components;
generating a system of equations that describe suitable combinations of components in locations in a battery design layout for the battery, the system of equations being generated based at least partially on rules and constraints, wherein the generating further comprises receiving, for a user, at least one of an optimality gap for a solution that provides for a margin by which the solution for the battery is within a predetermined percentage of optimal or a time limit of optimization, wherein integer optimization optimizes one or more objective functions within the optimality gap or until the time limit has been reached;
analyzing the system of equations using integer optimization,
wherein the integer optimization optimizes, based at least partially on the operational parameters, one or more objective functions in the system of equations to determine at least one solution for the battery design layout, and
wherein the at least one solution comprises a set of the components for the locations in the battery design layout for the battery; and
providing, via an interface, the at least one solution to the user; and
testing the battery based on the battery design layout under operating conditions.

14. The non-transitory computer readable medium of claim 13, wherein the battery design layout of the battery comprises a partial set of the components to be included in the battery.

15. The non-transitory computer readable medium of claim 13, wherein the one or more objective functions comprise minimizing difference in capacity of virtual cells in the battery, minimizing difference in impedance of a module comprising the virtual cells, and minimizing difference in impedance in the virtual cells.

16. The non-transitory computer readable medium of claim 13, wherein the rules and constraints comprise a constraint that an individual component in the components only being used at one location in the locations in the battery design layout for the battery and each location is populated with exactly one combination of one or more individual components.

17. The non-transitory computer readable medium of claim 13, wherein the operational parameters comprise capacity of the components, impedance of the components, voltage of the components, and current of the components.

\* \* \* \* \*

UNITED STATES PATENT AND TRADEMARK OFFICE
CERTIFICATE OF CORRECTION

PATENT NO. : 10,318,656 B2
APPLICATION NO. : 15/138815
DATED : June 11, 2019
INVENTOR(S) : Kelsea Cox et al.

Page 1 of 1

It is certified that error appears in the above-identified patent and that said Letters Patent is hereby corrected as shown below:

In the Claims

Column 15, Line 41, Claim 7 delete "clap", and insert therefor --gap--.

Signed and Sealed this
Fifteenth Day of October, 2019

Andrei Iancu
*Director of the United States Patent and Trademark Office*